United States Patent [19]
Yoshimura et al.

[11] Patent Number: 5,374,865
[45] Date of Patent: Dec. 20, 1994

[54] MULTI-PHASE HYBRID STEPPER MOTOR

[75] Inventors: Noriyuki Yoshimura; Kenji Yoshida, both of Nagano, Japan

[73] Assignee: Minebea Co., Ltd., Kitasaku, Japan

[21] Appl. No.: 99,539

[22] Filed: Jul. 30, 1993

[30] Foreign Application Priority Data

Jul. 31, 1992 [JP] Japan .................. 4-224844

[51] Int. Cl.$^5$ ............................................ H02K 37/00
[52] U.S. Cl. ................................ 310/49 R; 318/696
[58] Field of Search ................... 310/49 R; 318/696

[56] References Cited

U.S. PATENT DOCUMENTS

| | | | |
|---|---|---|---|
| 3,866,104 | 2/1975 | Heine | 318/696 |
| 4,000,452 | 12/1976 | Heine | 318/138 |
| 4,095,161 | 6/1978 | Heine et al. | 318/696 |
| 5,309,051 | 5/1994 | Kobori | 310/49 R |
| 5,315,192 | 5/1994 | Satomi | 310/49 R |

*Primary Examiner*—Steven L. Stephan
*Assistant Examiner*—Judson H. Jones
*Attorney, Agent, or Firm*—Staas & Halsey

[57] ABSTRACT

To minimize fluctuation of torque, improve torque stiffness, and reduce resonance vibration during rotation in the hybrid stepper motor.

The magnetic poles have two or more teeth placed with the same spaces as with toothpitch of the rotor. The total number (NS) of the teeth of the nonsymmetrical stators is determined by $NS = 5 \times (n0 + n1)$, where n0 is the number of teeth of each of five poles and n1 is the number of teeth of each of remaining five poles. The nonsymmetrical stator, of which the teeth are n1, is placed between the nonsymmetrical stators, of which the teeth are n0, so that the nonsymmetrical stator, of which the teeth are n0, is placed on the opposite side of the nonsymmetrical stator, of which the teeth are n1, when the core of the rotation axis is the center. The total number (NS) of the teeth (NR) of the rotor and the teeth of the stators corresponds to the relationship of $NS \geq 0.8\ NR$ (NS is equal to or greater than 0.8 NR), and the difference between NR and NS is defined by the equation $NR - NS = K(S0 - S1) + 10(S1 - 1 + B)$, where K is an integer between 2 and 5, S0 and S1 are integers as small as possible in such a way that S1 can also be equal to S0, B is a fraction of 1, 10B is an integer. The ten windings produce as many north-and south-poles as necessary by using a power supply method to supply applied power to achieve full step angles = electrical angle $90° = \alpha F$, $\alpha F = 360°/10\ NR$ and half step angle = electrical angle $45° = \alpha H$, $\alpha H = 360°/20NR$.

20 Claims, 18 Drawing Sheets

Fig. 7

| STEP \ POLE | 1 | 2 | 3 | 4 | 5 | 6 | 7 | 8 | 9 | 10 |
|---|---|---|---|---|---|---|---|---|---|---|
| 1 | N | N | S | S | N | N | N | S | S | N |
| 2 | N | N | S | S | – | N | N | S | S | – |
| 3 | N | N | S | S | S | N | N | S | S | S |
| 4 | N | N | – | S | S | N | N | – | S | S |
| 5 | N | N | N | S | S | N | N | N | S | S |

N ··· N POLE  
S ··· S POLE  
– ··· OFF MODE

Fig. 8

| STEP \ POLE | 1 | 2 | 3 | 4 | 5 | 6 | 7 | 8 | 9 | 10 |
|---|---|---|---|---|---|---|---|---|---|---|
| 1 | N | S | S | N | N | S | N | N | S | S |
| 2 | N | – | S | N | N | S | – | N | S | S |
| 3 | N | N | S | N | N | S | S | N | S | S |
| 4 | N | N | S | – | N | S | S | N | – | S |
| 5 | N | N | S | S | N | S | S | N | N | S |

N ··· N POLE  
S ··· S POLE  
– ··· OFF MODE

Fig. 19

| STEP \ POLE | 1 | 2 | 3 | 4 | 5 | 6 | 7 | 8 |
|---|---|---|---|---|---|---|---|---|
| 1 | N | N | S | S | N | N | S | S |
| 2 | – | N | – | S | – | N | – | S |
| 3 | S | N | N | S | S | N | N | S |
| 4 | S | – | N | – | S | – | N | – |
| 5 | S | S | N | N | S | S | N | N |

N ··· N POLE  
S ··· S POLE  
– ··· OFF MODE

Fig. 20

| STEP \ POLE | 1 | 2 | 3 | 4 | 5 | 6 | 7 | 8 | 9 | 10 |
|---|---|---|---|---|---|---|---|---|---|---|
| 1 | N | S | N | N | S | N | S | N | N | S |
| 2 | N | S | N | – | S | N | S | N | – | S |
| 3 | N | S | N | S | S | N | S | N | S | S |
| 4 | N | S | N | S | – | N | S | N | S | – |
| 5 | N | S | N | S | N | N | S | N | S | N |

N ··· N POLE  
S ··· S POLE  
– ··· OFF MODE

MULTI-PHASE HYBRID STEPPER MOTOR

BACKGROUND OF THE INVENTION

1. FIELD OF THE INVENTION

This invention relates to improvements for a multi-phase hybrid stepper motor.

2. DESCRIPTION OF THE PRIOR ART

Hybrid stepper motors are known to be excellent actuators whenever high precision positioning is required, for more than twenty-five years. Areas of application include any kind of handling-equipment in manufacturing, up to full process automation, as well as in the computer peripherals industry (i.e. printers, plotters, facsimiles, and disc-drives).

A. The Four-Phase Hybrid Stepper Motor

The most common motor is a so called four-phase motor with 8 mainpoles. FIG.9 (a) and (b) illustrate cross-sectional views A—A and B—B of FIG. 10, the four-phase hybird stepper motor. Each of these statorpoles has a winding 11 and 5 teeth 12. As illustrated in FIG.10, teeth 12 face to the inner rotating teeth 15 of rotorcaps 14 (hole cap, at least two) with are mounted one on each side of a an axial magnetized permanent magnet 13. In this case the rotorcaps 14 have 50 teeth 15 each, on creating north-poles, and the other one creating south-poles with a toothpitch of 360/50 degrees=7.2 degrees. Two rotorcaps 14 are offset to each other in rotational direction by one half toothpitch. These rotorcaps 14, mostly made out of silicon lamination material or solid magnetically soft iron, together with the magnet mounted on a shaft 16, represent a rotor system.

Currently there are hybrid stepper motors on the market with more than one rotor system. Most commonly, the toothpitch of the statorpole teeth is the same as the rotor toothpitch, Tp. In FIG.9 adjacent poles in this case are 45° away from each other center of middle tooth of the adjacent pole). The physical shiftangle between any adjacent pole is now 45° divided by 7.2° (toothpitch) minus integer numbers of toothpitch, and equals ¼ of the toothpitch. This is equivalent to 90° electrical, since one toothpitch represents 360° electrical.

This stator and its lamination can be considered to be a symmetrical stator-lamination, since every pole has the same number of teeth with the same toothpitch and the same winding-slot-opening between adjacent outer teeth of adjacent poles. In this case 2.25 Tp minus toothwidth.

Theoretically these motors could be built with 48 stator teeth (6 teeth per pole), if the slot openings in the case of 1.25 Tp minus one toothwidth allow the insertion of the winding and create a phase-inductance as required.

These motors can have a symmetrical lamination for any number of rotor teeth which fulfills the following requirement of:

Number of rotor teeth divided by number of stator mainpoles equal to K +¼, K being an integer. As an example, 50/8=6.25 will create a symmetrical lamination. 48/8=6, does not work because there is no shiftangle. For instance, any motor with a number of rotor teeth NR=8(K+0.25) can have a symmetrical stator. So NR=10; 18; 26; 34; 42; 50; and 58 will allow a symmetrical lamination with 8 stator-poles.

These motors create a sinusoidal detent-torque which is periodical with on fourth of the toothpitch and keeps the rotor in position without any external statorpole excitation.

When considering that every pole when energized, together with the rotor system develops a nearly sinusoidal holding torque (FIG.11), which is periodical with the toothpitch Tp, and since each pole is 90° electrical away from each other, one can design the following torque-vector-deagram, FIG.12. It is easy to see that phase I is given by poles 1 and 5, phase II by poles 2 and 6, phaseIII by poles 3 and 7,and phase IV by poles 4 and 8. It can also be seen that maximum torque is obtained when all of the 8 poles are energized. A full-step angle of $\alpha F=90°$ electrical or $\alpha F=\frac{1}{4}$ Tp will be achieved when the polarization of four phases (i.e. 1; 5; 3; 7) gets changed at the same time. A halfstep angle of $\alpha H=45°$ or $\frac{1}{8}$ Tp will be reached when those aforementioned poles are switched off instead of being changed in polarization.

In this case the torque varies in halfstep mode by $\sqrt{2}$ to 1. Since two poles are always 180° away from each other (i.e.1 to 3 or 2 to 4), and also since the maximum torque will develop from step to step when 4 poles get changed in polarity at the same time, phase I and III can be connected with each other as well as phases II and IV . This allows a relatively simple, so called H-Bridge driver with a total of 8 transistors to achieve fullstep and halfstep modes.

When energized in these two modes, the 8 poles have a polarization as shown in FIG .19. Here step 1 represents a fullstep position and step 2 a halfstep position.

As it can be seen in FIG. 19, this motor has as many north-poles as south-poles at any time. This means that the radial forces on the north-rotorcap are the same as they are on the south-rotorcap. This is important in order to avoid major bearing damage over lifetime, as well as to insure a better reaction against mechanical inaccuracy to keep small stepangle tolerances.

From FIG. 13 it is also visible that whenever all 8 poles are energized, we have two north-poles adjacent, followed by two adjacent south-poles. This gives good stability at fullstep positions, since FIG. 11 shows the detent (fourth harmonic) will not support the stiffness of an 8-stiffness of an 8-pole energized holding horque when inphase with a single pole (FIG. 11 shows the detent offphase).

All of the discriptions above can be summarized by the following general laws for symmetrical hybrid stepper motors:

1. Number of rotor teeth given by $$NR=mp[(n-1)+(K+1/m)]$$

where:
    m=number of phases
    p=number of poles per phase
    K=positive integer equal or greater than one
    n=number of teeth per pole 2. Highest possible number of stator teeth $$NS \max = NR - p$$

and $$NS = mpn$$

therefore Ns has to be always smaller than NR

3. The smallest possible number of stator poles is equal to the number of phases. This means that the smallest possible number of poles per phase is one.

$|mp|min = m$

4. Stator toothpitch Tp can be the same as rotor toothpitch $TpS = TpR$ with $TpR = 360°/NR$ But for any symmetrical motor lamination the stator tooth can also be $Tps = 360°/NR - p$ 5. The basic detent-torque as well as the torque variation at speed (cogging) is periodical with the $m^{th}$ harmonic of the rotor toothpitch.
6. Number of steps per revolution for:
   fullstep mode: $NREVF = mNR$
   halfstep mode: $NREVH = 2mNR$
   Consequently the stepangles are
   $\alpha F = 360°/mNR$ and
   $\alpha H = 180°/mNR$ B. Disadvantages of Hybrid-Stepper Motors with Four (or less) Phases 1. Large variation in dynamic torque during switching from step to step and also in static positions when in halfstep mode.
   The variation factor is $1/\sqrt{2}$.
2. Relatively high detent-torque which can destroy the stepangle accuracy as well as the movement during micro-stepping.
3. For micro-stepping mode a sinewave-current variation requires very small changes at the top of the sinewave. With small motors the rotor may not move because the torque change is too small.
4. These motors develop relativery strong resonances at step frequencies below 1 kHz due to the torque variations. Sometimes those motors have speed zones in which the rotor will not rotate without a certain load or additional damper.
5. Start-and stop-stop frequencies are relatively low.
6. Due to the limited number of possible rotor teeth, most of the achievable step angles and the number of steps per revolution are not very practical for many industrial applications.

C. The Five-Phase Hybrid Stepper Motor Some of the above mentioned disadvantages can be eliminated when going to a higher number of phases.

The U.S. Pat. Nos. 3,866,104 and 4,000,452 describe a five-phase hybrid motor which follows the same basic laws (equations) as layed out above.

But in this case, since the number of phases divided by two (2) is not creating an integer and since in a PM-motor a change in current-derection is shifting the polariry by 180° electrical (FIG.13), which is two times higher than normal.
Therefore:

$NREVF = 2mN_R$ and $\alpha F = 180°/mNR$ $NREVF = 4mN_R$ and $\alpha H = 90°/mNR$ The basic U.S. Pat. No. 3,866,104 describes a five-phase motor with a shiftangle between adjacent poles of 3/5 Tp. Therefore an electrical angle of 72° (1/5 Tp) will be achieved between poles 2 and 4 (FIG.14).

In this case we will achieve a torque-vector-vector-diagram as shown in FIG.15, and a pole polarization table as shown in FIG. 20.

These two figures show that one can achieve fullstep with 5 phases on as well as with 4 phases on. Halfstep will be achieved when alternating between 5 phases on and 4 phases on. The torque difference in halfstep mode is just 5(percent). The cogging-torque as well as the detent-torque are the 5th harmonics (FIGS.16). This is a great improvement compared to the earlier described motor.

The resonance-frequencies are in a much higher range and no "none-running" speed zone can be realized.

The possible number of rotor teeth for symmetrical laminations follows the equation $NR = 5p[(n-1)+(K+3/5)]$ Therefore one can achieve rotor teeth numbers like 16; 26; 36; 46; 56; etc. Only the number 36 is of industrial interest or importance. Numbers like 50 or 100, which are very important for many applications, cannot be obtained in a symmetrical design as such. As U.S. Pat. No. 4,095,161 describes however, a symmetrical five-phase lamination with a shiftangle of 3/5 Tp can be used together with 4 different numbers of rotor teeth. As an example, the lamination shown in FIG. 14 is designed for NR=36, but it can be used also with NR=32,38,42. Numbers such as NR=20,30,40,50, etc. are only possible if we go to a nonsymmetrical lamination design, as described in U.S. Pat. No. 3,866,104. This means that the maximum number of stator teeth will be less since there are always 4 rotor toothpitches($T_p$), which cannot be used in conjunction with stator teeth.

A lamination design of such a motor is shown in FIG. 17(NR=50). The basic equation for such a five-phase nonsymmetrical motor is: $NR = 5p[(n-1)+(K+3/5)]+4$ The smallest possible difference between NR and NS is 5p. Therefore for a 10pole motor the smallest difference is 10, which means a motor for 500 steps per revolution, with an angle of $\alpha_F = 0.72°$, NR will be 50, and NS will be 40. This results in a decrease of the maximum possible torque and has to be considered as a disadvantage. Other disadvantages are the following items:

1. Even though the detent-torque is small, it can reduce the stepangle accuracy, since it can change the holdingtorque equilibrium point→FIG. 16.
2. When in halfstep mode with 5 or 3 phases on, the number of stator north-poles will never be the same as the number of stator south-poles→FIG. 20. This creates an imbalance in the radial force(→FIG. 18) on the two rotorcaps, which puts more force on the bearings. It is also more sensitive to manufacturing tolerances and reduces the stepangle accuracy. Since the number of north-and south-poles will change every second step inhalfstep mode, the radial force on the rotorcaps will change every second step. This, together with the 4(or 2) larger-winding-slot openings,creates larger vibrations at some speed frequencies.
3. The difference in the number of north-and south-poles, and the variation at every second step, creates higher hysteresis-values in halfstep mode, since the tooth-and pole-induction will be higher over the rotorcap with the smaller number of north-or south-poles.

4. A five-phase motor with a shiftangle between adjacent poles of 3/5 Tp, such as this, will not allow the same polarization on two two adjacent poles, as described for the motor with four phases. This reduces the stability in the equilibrium positions. As mentioned above, conventional four or five-phase stepper motor has many faults. The present invention is formed in order to solve the above mentioned faults, and it is an object of the present invention to provide a hybrid stepper motor improving in torque-stiffness with reducing the torque variations to a minimum, and in capable of reducing the resonant vibrations during rotation.

SUMMARY OF THE INVENTION

According to the present invention, there is provided a multi-phase hybrid stepper motor comprising of a rotor system with at least one axially magnetized permanent magnet, having one polecap oneach side the polecap made of soft magnetic iron, with a sectional figure of a disc or "]" shape, having on its periphery a number of NR evenly spaced, radially outward directed teeth; the rotor polecaps on each sideare offset in rotational direction to each other by one half (½) toothpitch Tp=360°/NR, a nonsymmetrical stator surrounding the rotor and having ten(10) radially inwardly directed statorpoles, each of the poles having one untapped winding; the poles having two or more teeth spaced with the toothpitch Tp, a total number of stator teeth Ns corresponding to the relation of Ns=5(n0+n1) with n0 being the number of teeth of each of 5 poles and n1 the number of teeth of each of remaining 5 poles, each one of the poles in between of the 5 poles with n0 teeth placed in such a way that opposite of each of the poles n0 teeth is one pole with n1 teeth, a relationship between the number of rotor teeth NR and the total number of said stator teeth Ns of N5>=0.8 NR(equal or greater than) and with a difference between NR and N5 which is defined by the equation NR−Ns=K(So−S1)+10(S1−1+B), where K is any integer varying from 2 to 5, S0 and S1 are integers as small as possible in such a way that S1 can also be equal to S0 and where B is a fraction of one(1) in such a way that 10B(10 times B) is always an integer; and a winding scheme in such a way that the 10 windings can be energizedthrough a voltage source or current source so that the 10 windings form as many north- and south-poles necessary to achieve full stepangles=90° =αF, αF =360°/10NR and half step-angle=45° =αH, αH=360°/20NR.

As the multi-phase hybrid stepper motor comprises teeth structure of the rotor and small teeth of statorpoles, accurate stepangle can be obtained, together with the holding-torque equilibrium position stability, and in addition, the mentioned hybrid stepper motor does not bring about an irregular vibration during the rotation at either fullstep mode or halfstep mode due to the same number of north- and south-poles.

BRIEF DESCRIPTION OF THE DRAWINGS

Fig.7 is a diagram indicating for varying pole of each of statorpoles.

FIG. 8 is another diagram indicating for varying pole of each statorpoles.

Fig.19 is a diagram indicating for varying pole of each of statorpolesof prior art.

Fig.20 is a diagram indicating for varying pole of each of statorpoles of prior art.

BRIEF DESCRIPTION OF THE PREFERRED EMBODIMENTS

Figure 1:
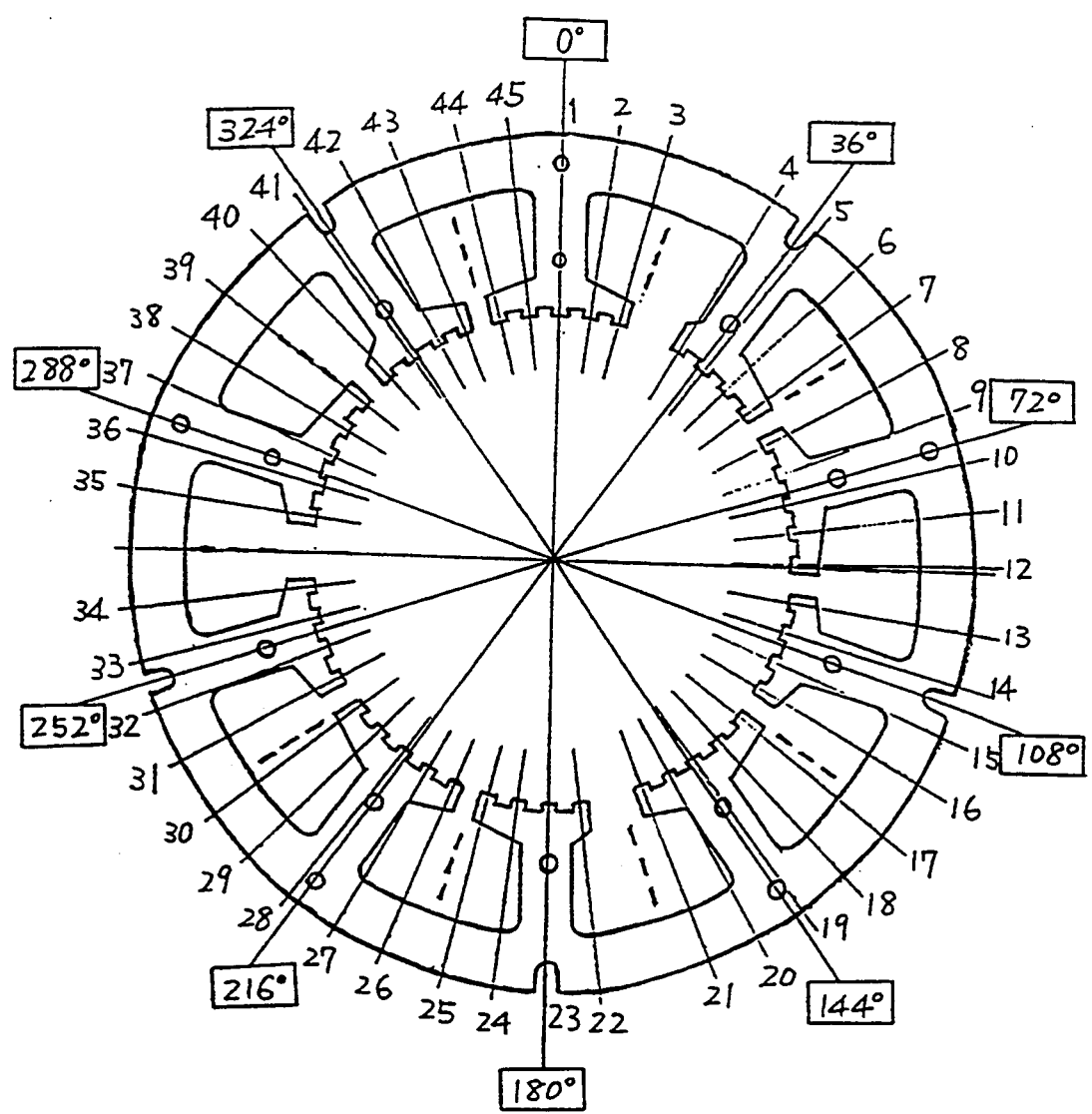
FIG.1 is a front view of an embodiment of the invention.

Embodiments of the present invention will now be described in detail with reference to the drawings. This invention will improve at least three of the five aforementioned disadvantages of the 10 statorpoles motor with nonsymmetrical stator. This invention can even improve some stator designs under all four areas. The first design would lead to improvements in torque-stiffness, stepangle accuracy, efficiency for a five-phase motor with 10 statorpoles, and NR=50, if we implement a shiftangle between adjacent statorpoles of 1/5. Instead of having 4 teeth on each of the 10 stator-poles, we add one tooth on every second statorpoles in such a way that opposite of a statorpole with 4 teeth, there is always a statorpole with 5 teeth (FIG. 1). This creates a difference of five (50 minus 5 times, minus 5 times 5) between the number of rotor teeth and stator teeth, while the standard design as described in U.S. Pat. No. 3,866,104 and its general equation create a difference of 10 teeth. Therefore the ratio of stator teeth to rotor teeth in the improved design is equal to 45/50=0.9, while the standard design allows only a ratio of 0.8.

This design also improves the torque equilibrium position stabilitysince at least two adjacent statorpoles have north-polarization, while two other adjacent statorpoles have south-polarization (FIG.7).

An additional improvement is to achieve a better speed behavior, since this design has three larger winding slot-openings compared with two or four slot-openings in the standard design. This triangular distribution of large slots together with the earlier described rectangular distribution in radial forces reduces the vibration.

To achieve major improvements in all four areas for a nonsymmetrica stator-lamination with 10 statorpoles, for a number of rotor teeth like 40,50,80,90 and 100, the next invention uses a shiftangle between adjacent statorpoles of 3/10 Tp or 7/10 Tp. Every second statorpole has one more tooth in the same way as described above.

Now all motors with very important stepangles can be designed with differences between the number of rotor teeth and stator teeth, as small as 5 and even some as small as 3.

Figure 2:
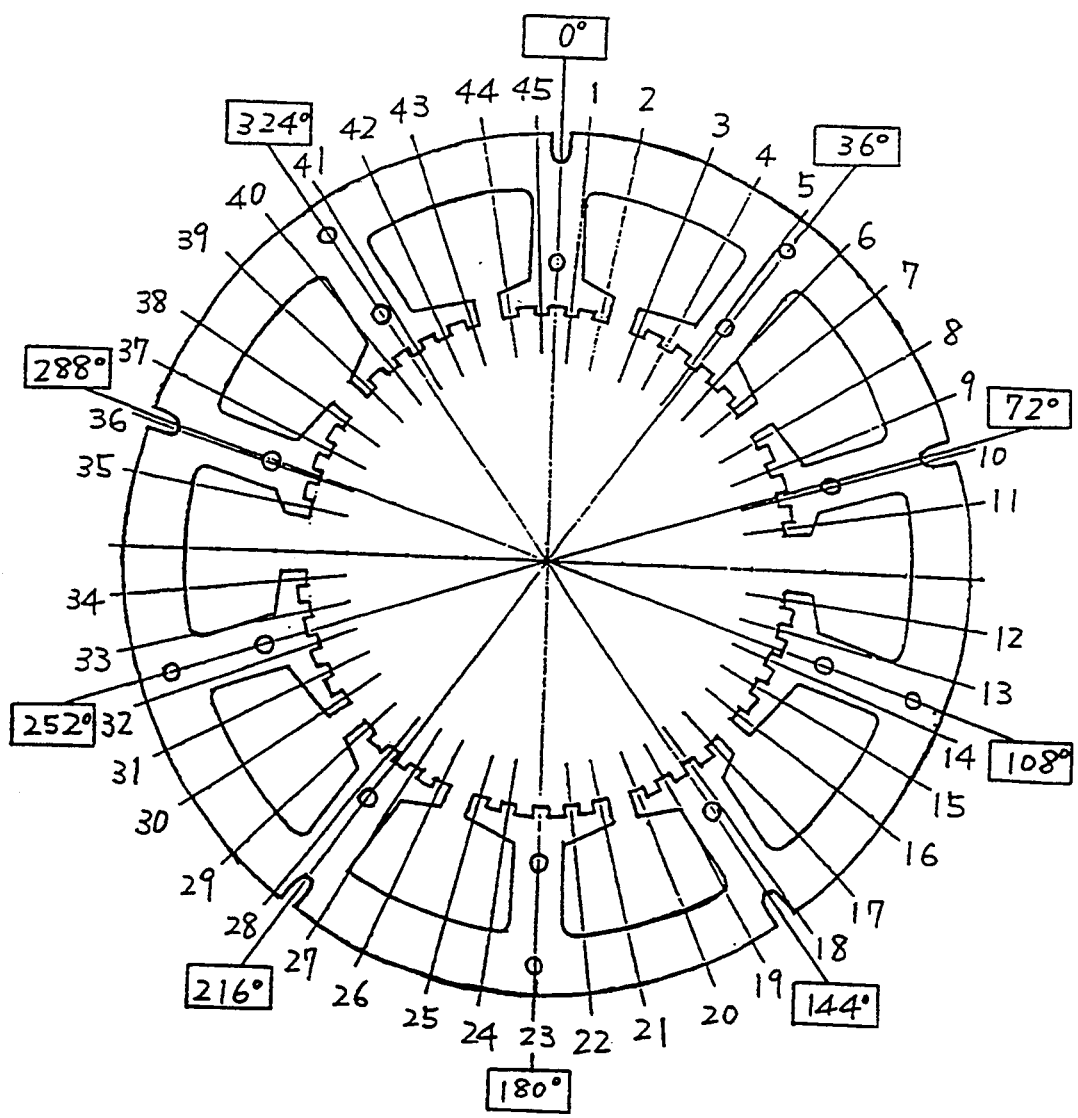
Fig.2 is a front view of another embodiment of the invention.
Figure 3:
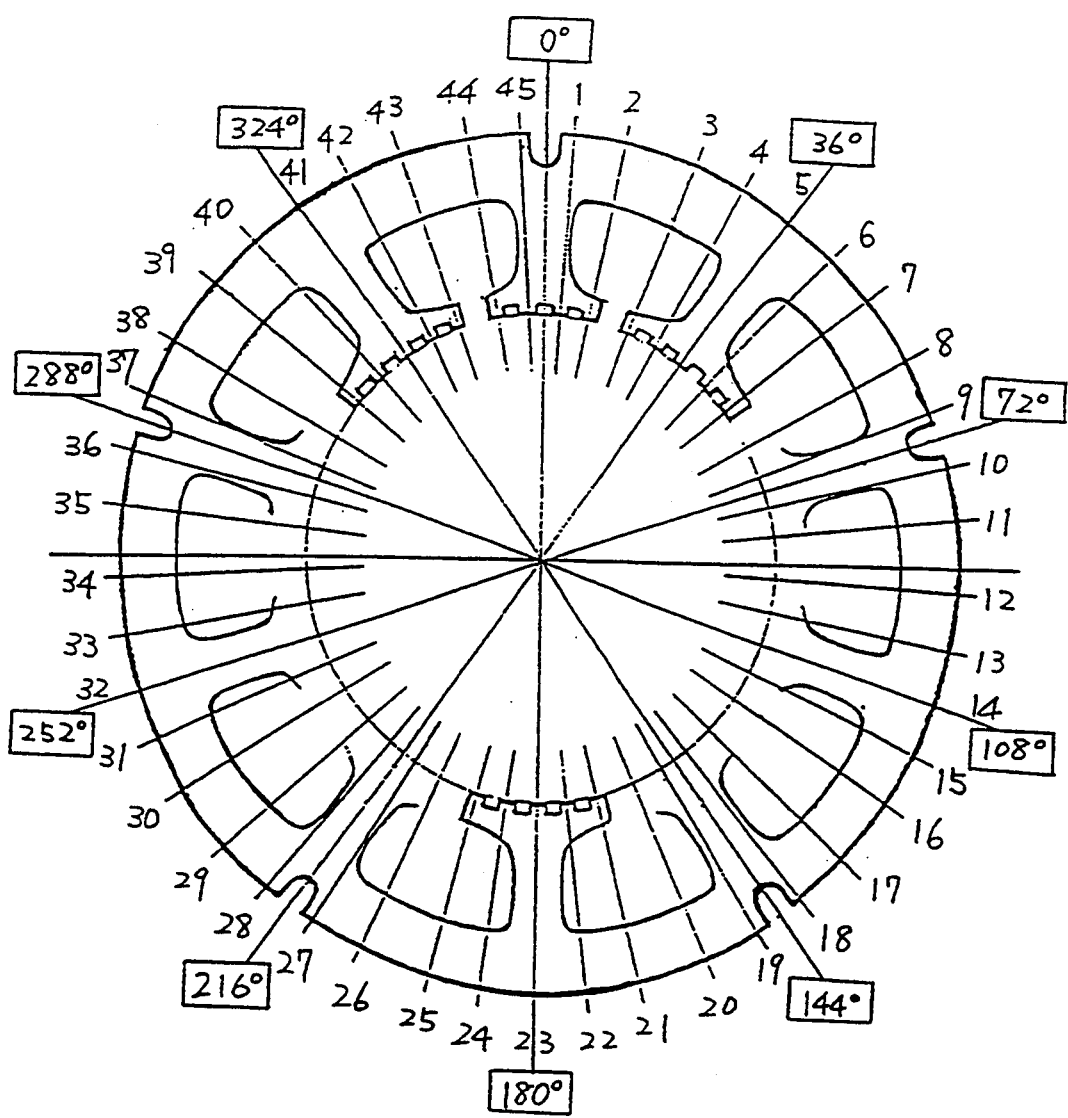
Fig.3 is a front view of another embodiment of the invention.

Additionally these motors need only two larger winding-slot openings with only one toothpitch more than the other 8 openings. Important motors, which have 10 equivalent slot openings, can now also be designed. FIG. 2 and FIG. 3 show two typical designs of this invention.

Figure 4:
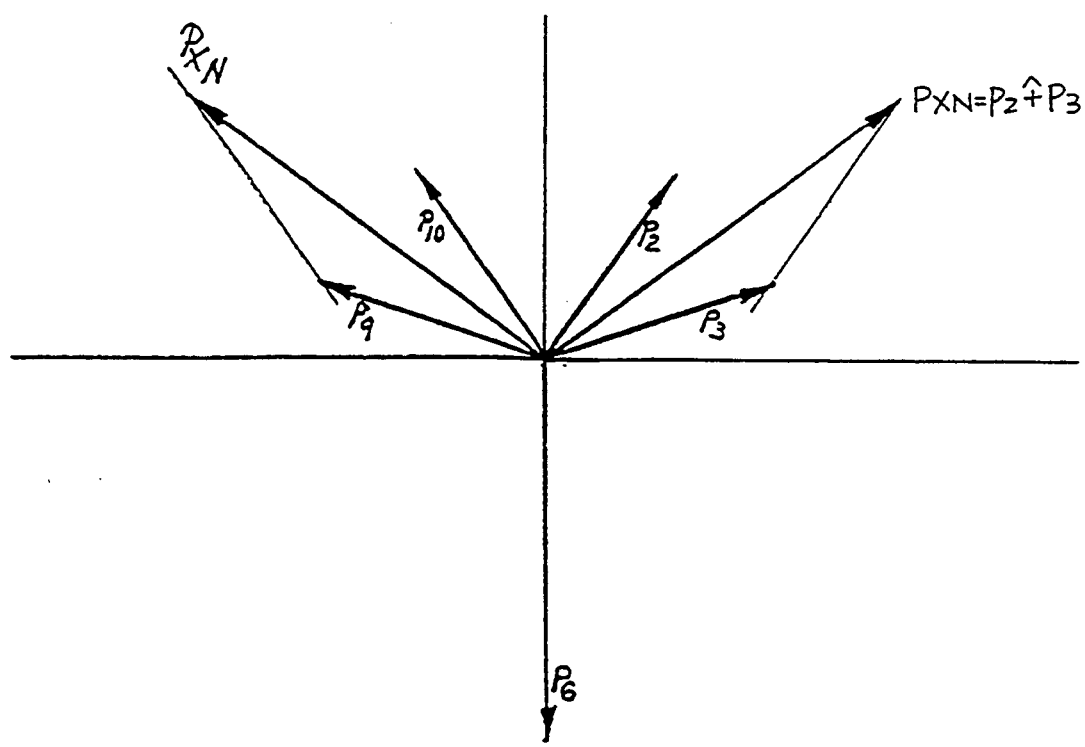
Fig.4 is a vector diagram for rotor of the invention.
Figure 4:
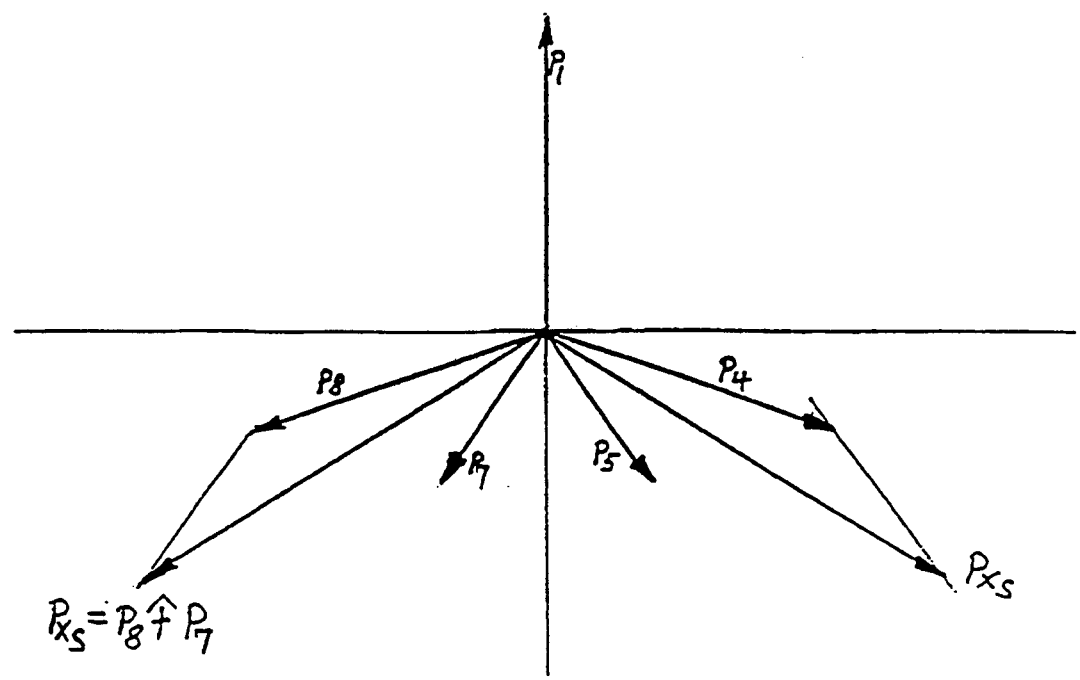
Figure 5:
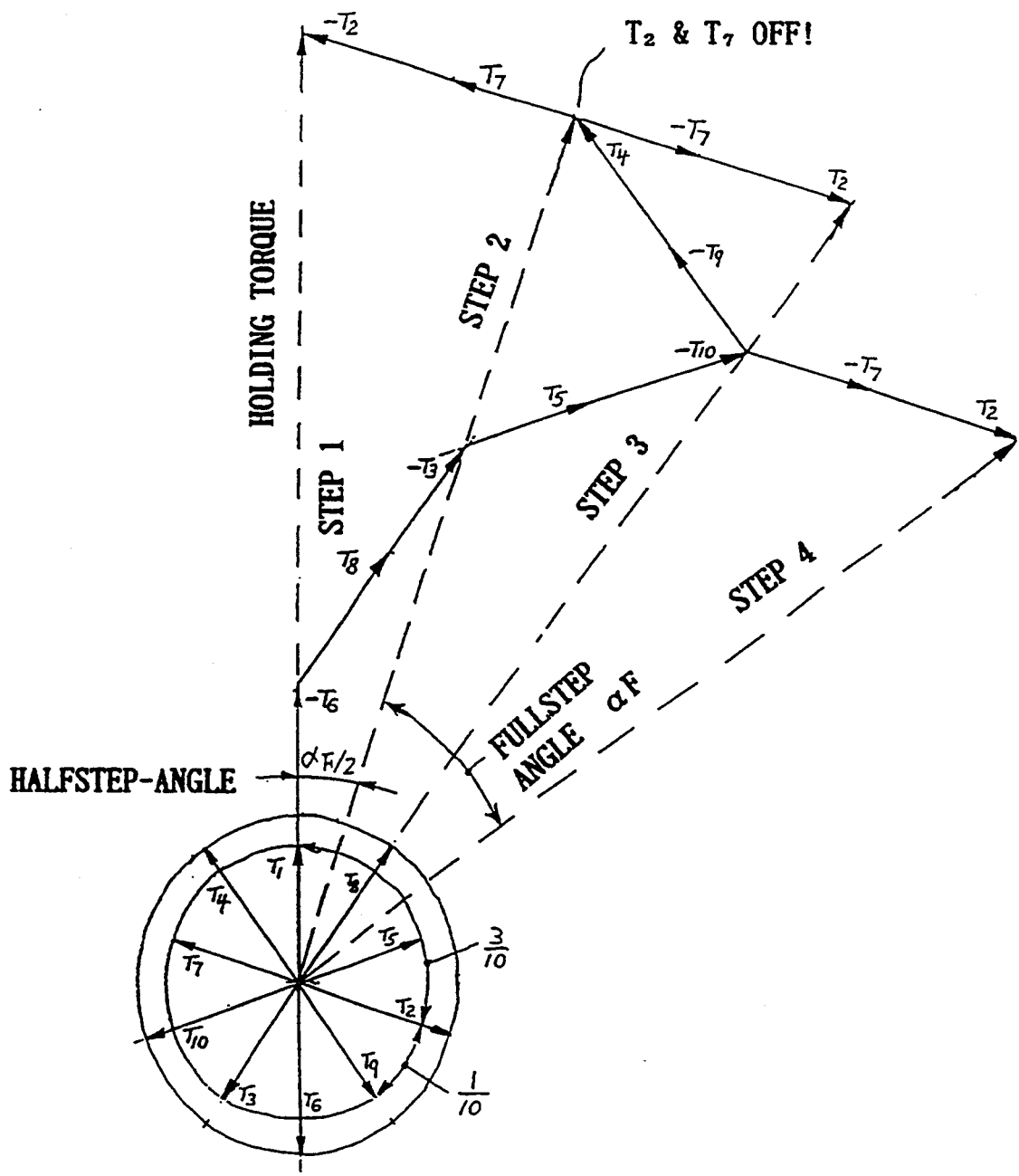
Fig.5 is a torque-vector diagram of the invention.

The radial forces on the rotorcaps, as shown in FIG. 4, now have a triangular distribution and they are more even on both rotorcaps. These triangular forms are much less sensitive to manufacturing tolerances, and improve the stepangle accuracy as well as they lead to a reduction in vibration, due to only two larger slot openings. Table 4 shows the statorpole polarization for three conceccutive steps, and it is evidient that in any position this motor has the same number of number has the same number of north-and south-poles. This redues the hysteresis. Also, at least two adjacent statorpoles are north, while at least two other adjacent poles are south. The torque improvement is shown in the vector diagram of FIG. 8. Because the shiftangle is selected at 3/10 Tp or 7/10 Tp, these motors with 10 statorpoles can be considered as 10-phase motors with p=1.

Figure 6:
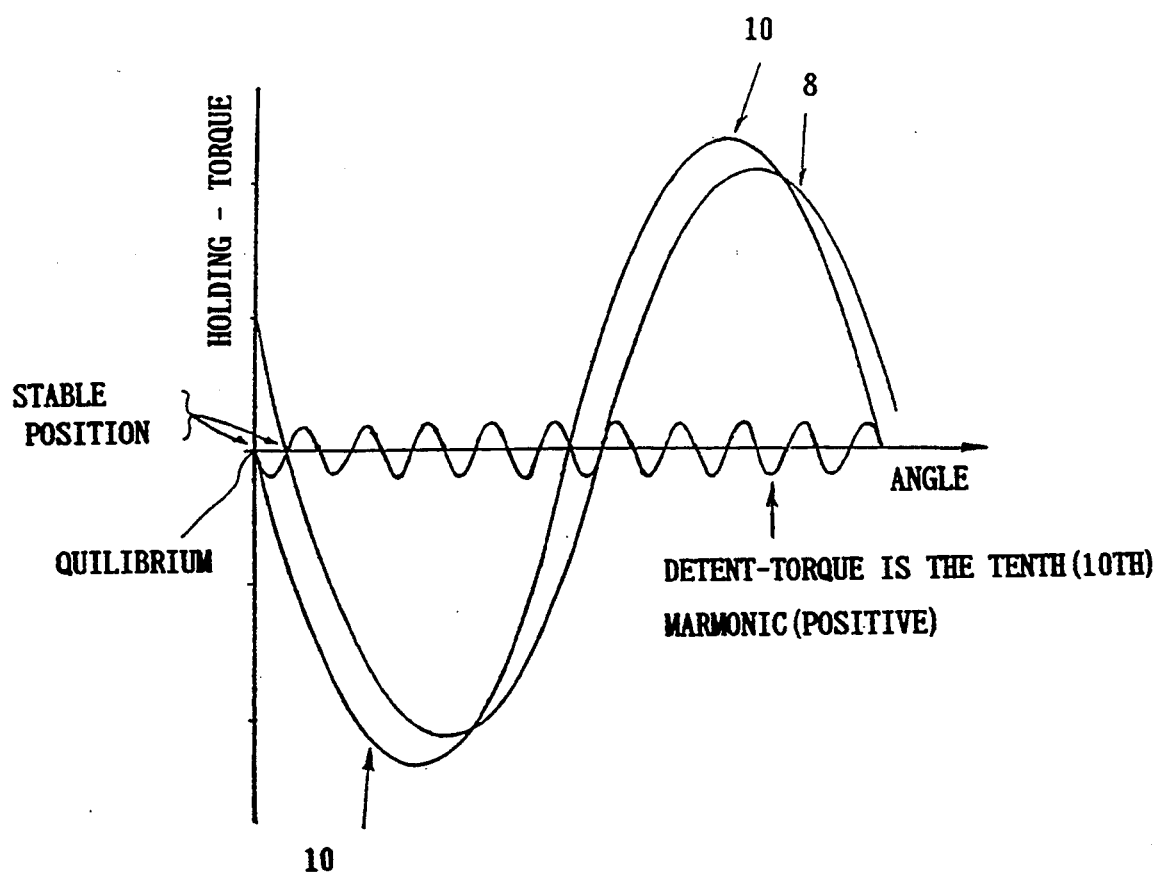
Fig.6 is a torque wave form diagram of the invention.
Figure 9A:
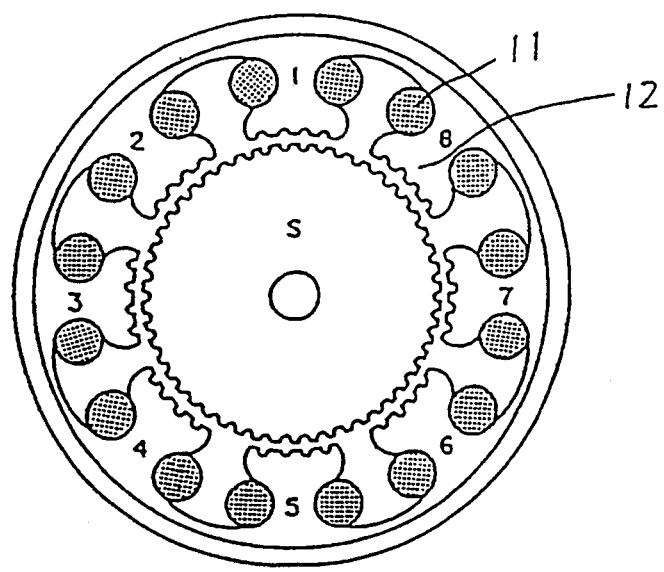
FIGS. 9a and 9b are front views of motor of prior art.
Figure 9B:
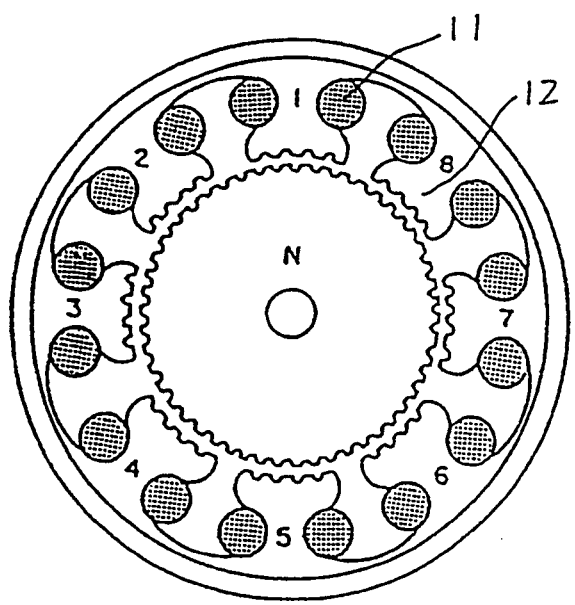
Figure 10:
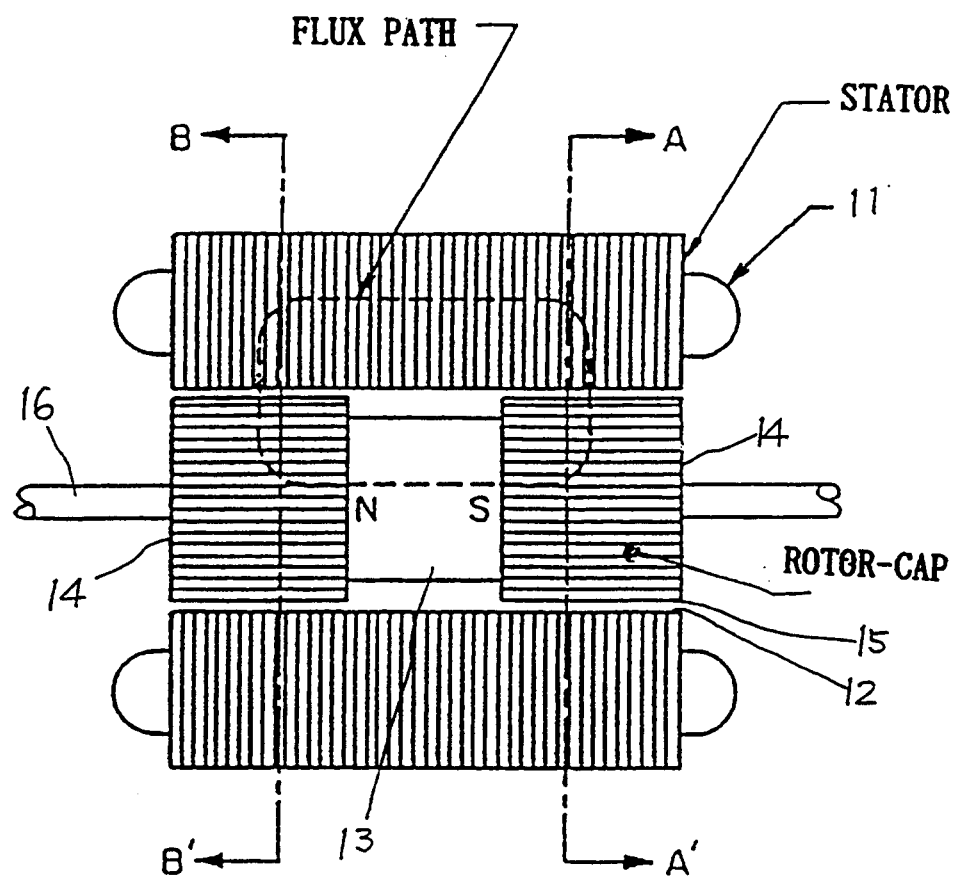
FIG.10 is a sectinal view of stepper motor of prior art.
Figure 11:
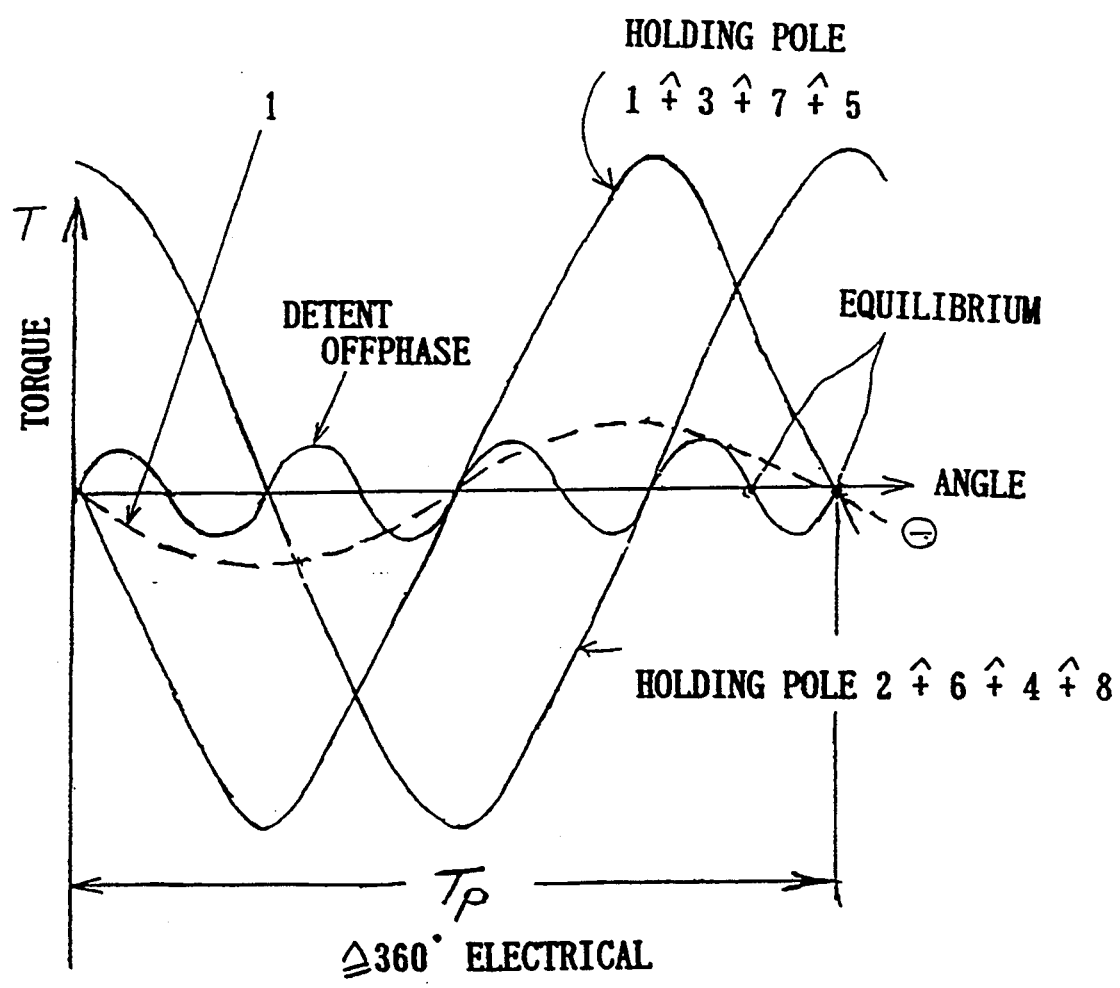
FIG. 11 is a torque wave form diagram of prior art.
Figure 12:
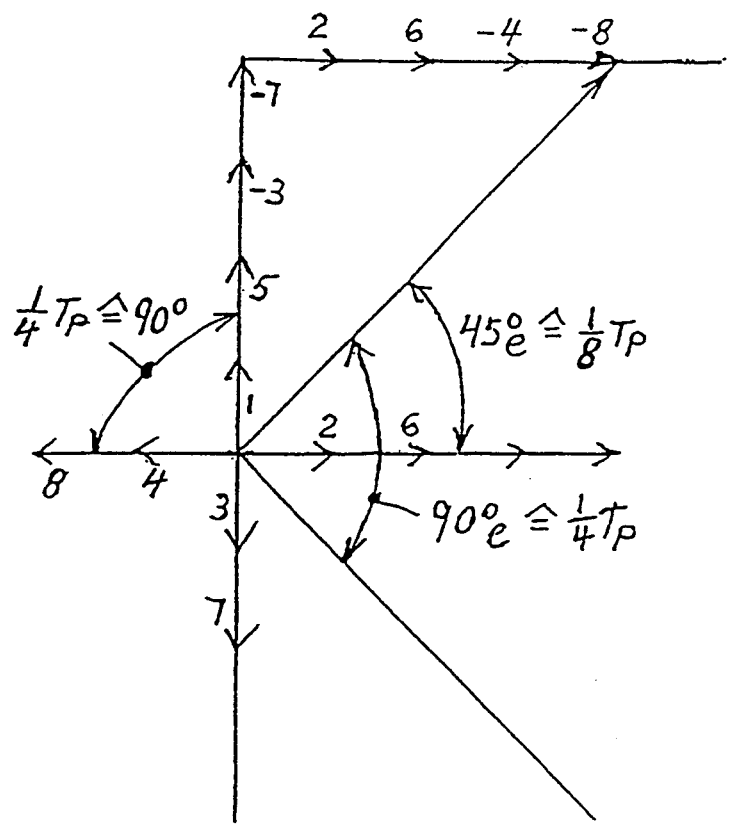
Fig.12 is a vector diagram indicating the holding-torque of prior art.
Figure 13:
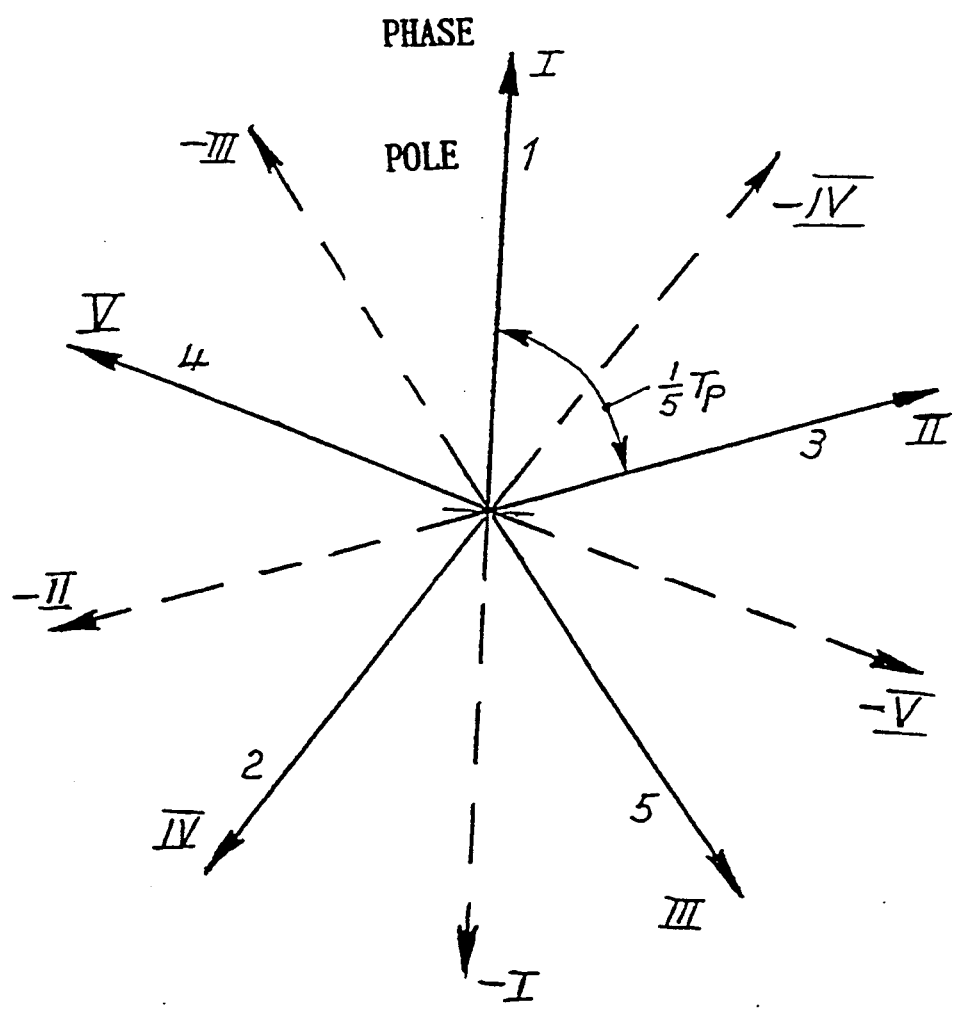
FIG. 13 is a torque-vector diagram of 5 phase motor of prior art.
Figure 14:
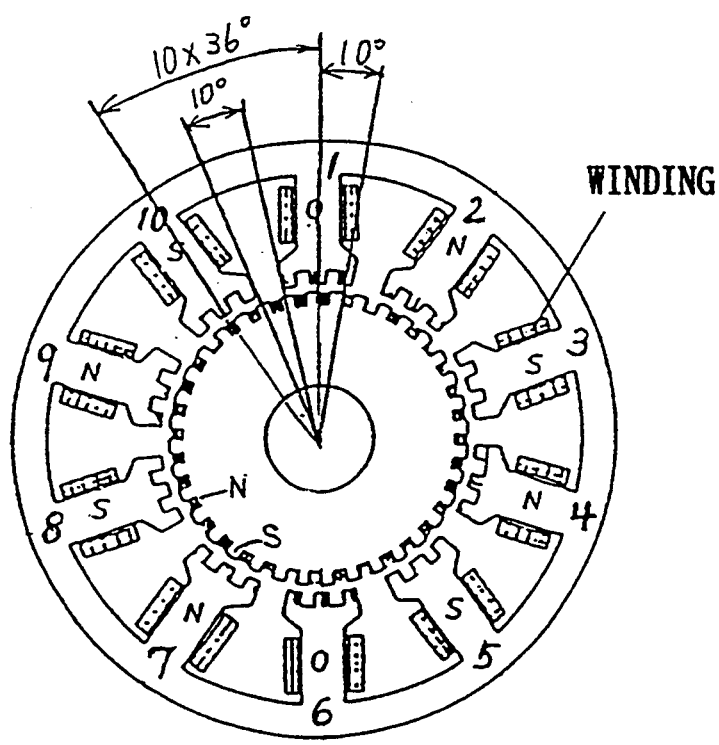
FIG.14 is a front view of symmetrical 5 phase stepmotor of prior art.
Figure 15:
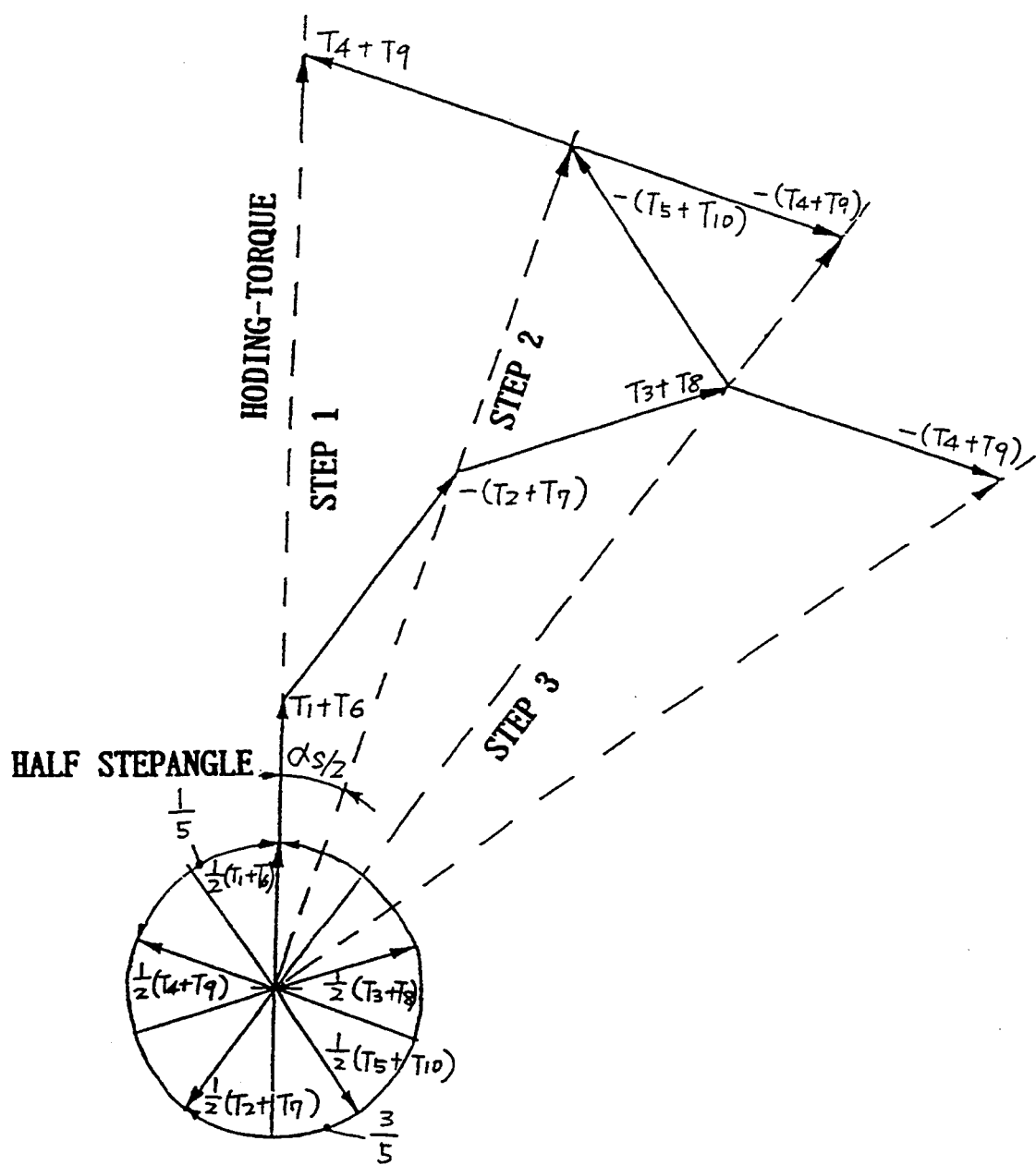
FIG.15 is a torque-vector diagram of 5 phase motor of prior art.
Figure 16:
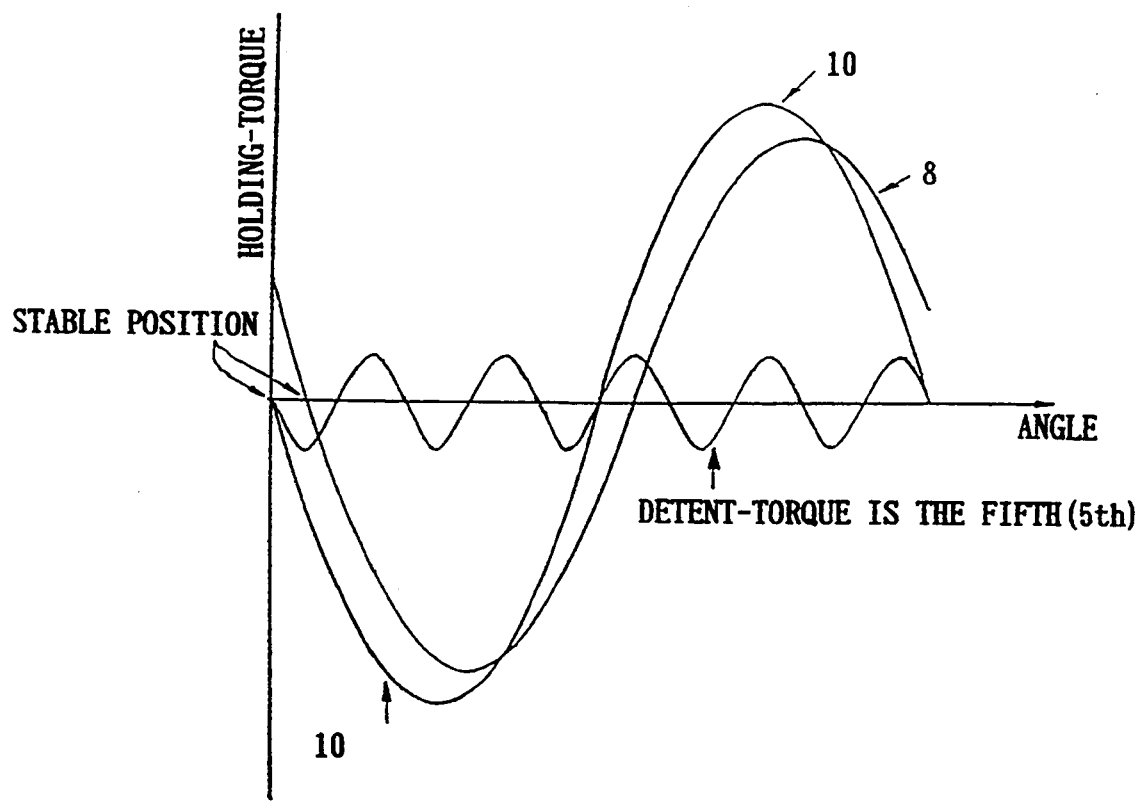
FIG.16 is a torque wave form of prior art.
Figure 17:
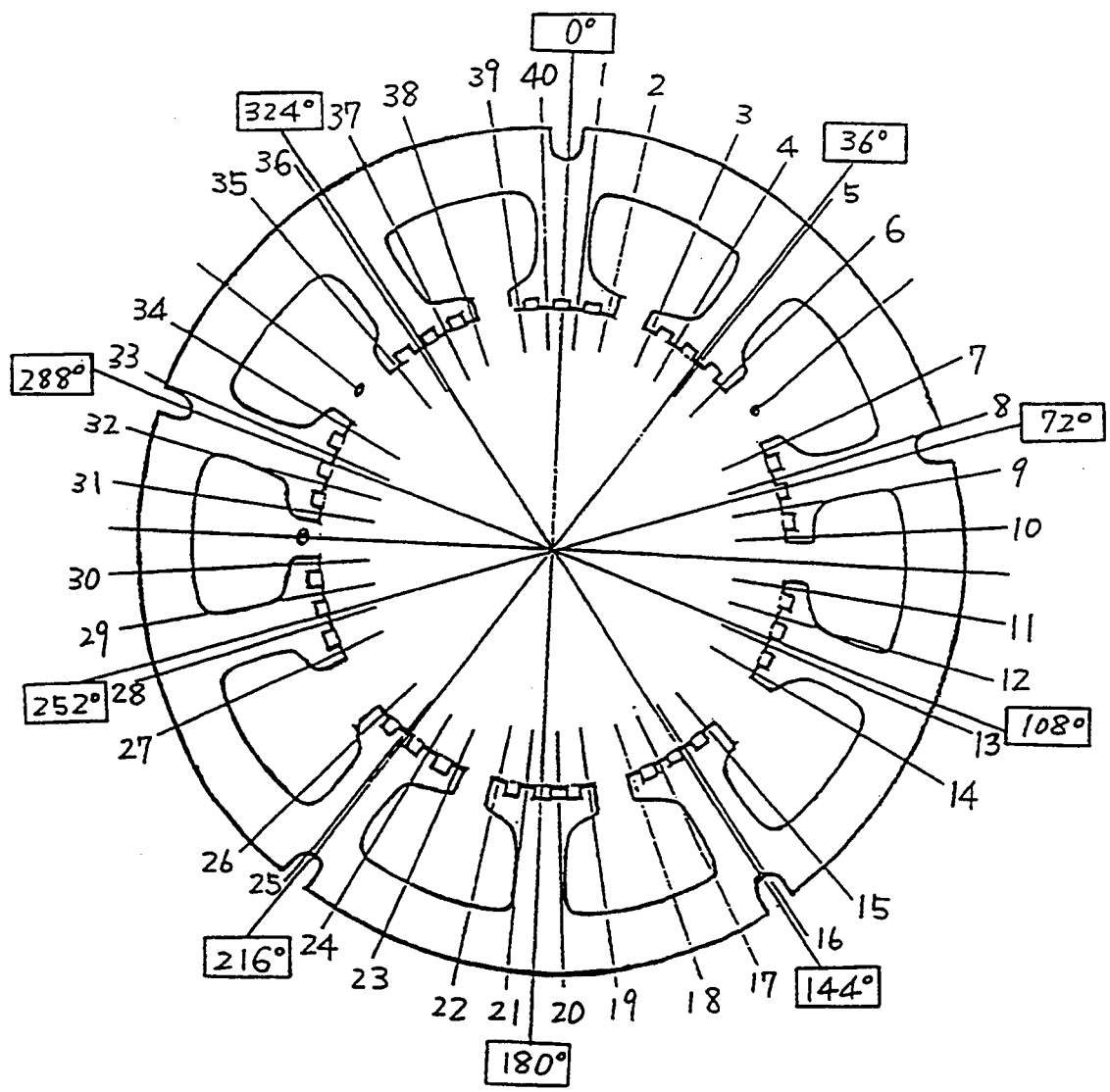
Fig.17 is a front view of nonsymmetrical statorpoles of prior art.
Figure 18:
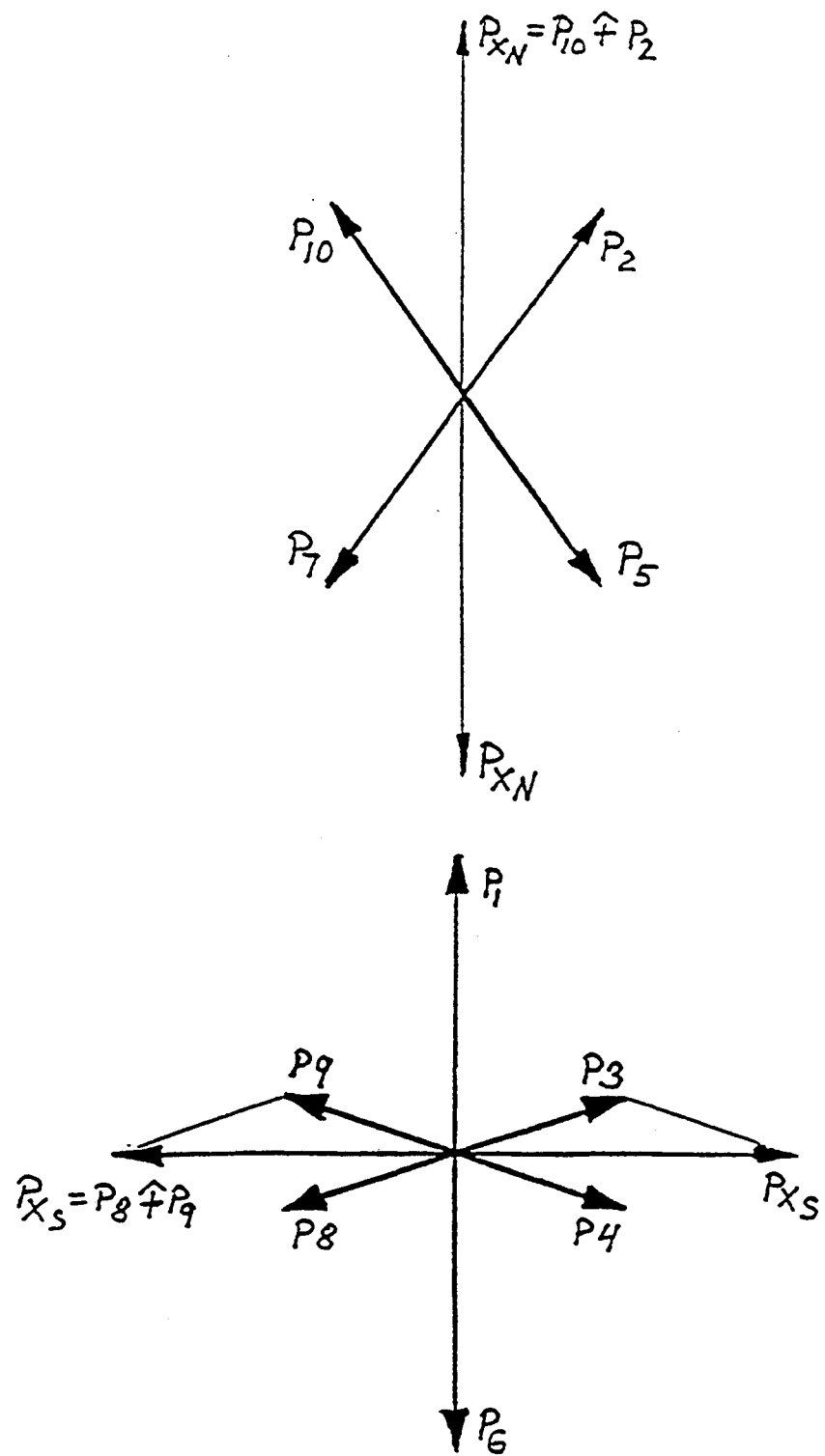
Fig.18 is a diagram indicating for varying pole of each of statorpoles of prior art.

In accordance to the earlier developed general laws, these motors will have a detent-torque that is equivalent to the 10th harmonic of the holding-torque-curve. As shown in FIG. 6, this will improve the balance in torque stiffness between 10 statorpoles energizedand 8 statorpoles energized. It also improves the step accuracy in halfstep mode, since the holding-torque curves cross the detent-curve at the zero positions.

This is the basic equation for the motors of this invention:

$$NR-NS=K(S0-S1)+10(S1-1+B) \text{ with}$$
$$NS=5(n_0+n_1)$$

$n_0$ = number of teeth on 5 poles
$n_1$ 32 number of teeth on the other 5 poles
k = any integer from 2 to 5
$s_0$ & $s_1$ = integers as small as possible
$s_0 = s_1$ is possible
B = afraction of 1 in such a way that 10B is an integer Although these motors have 10 phases, always two opposite phases can be combined while switching to another step position. This was already described for the 8-statorpole motor with 4 phases. Therefore, in principle these 10-phase motors can be energized througha Pentagon-Drive as described in U.S. Pat. No. 3,842,332. Also, in a bipolar star-drive, which reduces the number of switching transistors by the factor of two, as compared with a so called full H-bridge driver. As mentioned above, the claimed invention has features as follow: accurate stepangle can be obtained, together with the holding-torque equilibrium position stability, and in addition, the mentioned hybrid stepper motor does not bring about an irregular vibration during the rotation at either fullstep mode or halfstep mode due to the same number of north-and south-poles.

What is claimed is:

1. A multi-phase hybrid stepper motor comprising of a rotor system with at least one axially magnetized permanent magnet, having one polecap on each side; the polecap made of soft magnetic iron having on its periphery a number of NR evenly spaced, radially outward directed teeth; the rotor polecaps on each side are offset in rotational direction to each other by one half (½) toothpitch Tp=360/NR, a nonsymmetrical stator surrounding the rotor and having ten (10) radially inwardly directed statorpoles, each of the statorpoles having one untapped winding; the statorpoles having two or more teeth spaces with the toothpitch Tp, a total number of stator teeth NS corresponding to the relation of NS=5(n0+n1) with n0 being number of teeth of each of 5 poles and n1 the number of teeth of each of remaining 5 poles, each one of the poles in between of the 5 poles with n0 teeth placed in such a way that opposite of each of the poles n0 teeth is one pole with n1, teeth, a relationship between the number of rotor teeth NR and the total number of the stator teeth NS of NS≧0.8 NR (equal or greater than) and with a difference between NR and NS which is defined by the equation NR−NS=K(S0−S1)+10(S1−1+B), where K is any integer varying from 2 to 5, S0 and S1 are integers as small as possible in such a way that S1 can also be equal to S0 and where B is a fraction of one (1) in such a way that 10B (10 times B) is always an integer; and a winding scheme in such a way that the 10 windings can be energized through a voltage source or current source so that said 10 windings form as many north-and south-poles necessary to achieve full stepangles=electrical angle 90=αF, αF=360 s/10 NR and half stepangle=electrical angle 45=αH, αH=360/20 NR.

2. A stepper motor according to claim 1, wherein the 10 pole windings are connected in such a way to torm a dectagon with 10 connecting points of which every point can be individually connected through electronic switches with a voltage source, or current source north- and south-poles such that at least two adjacent poles are south.

3. A multi-phase hybrid stepper motor comprising of a rotor system with at least one axially magnetized permanent magnet, having one polecap on each side; the polecap made of soft magnetic iron having on its periphery a number of NR evenly spaced, radially outward directed teeth; the rotor polecaps on each side are offset in rotational direction to each other by one half (½) toothpitch Tp=360/NR, a nonsymmetrical stator surrounding the rotor and having ten (10) radially inwardly directed statorpoles, each of the poles having one uptapped winding; the poles having two or more teeth spaced with the toothpitch Tp, a total number of stator teeth NS corresponding to the relation of NS=5(n0+n1) with n0 being the number of teeth of each of 5 poles and n1 the number of teeth of each of remaining 5 poles, each one of the poles in between of the 5 poles with n0 teeth placed in such a way that opposite of each of the poles n0 teeth is one pole with n1 teeth, a relationship between the number of rotor teeth NR and the total number of the stator NS of NS≧0.8 NR (equal or greater than) and with a difference between NR and NS which is defined by the equation NR−NS=K(S0−S1)+10(S1−1+B), where K is any integer varying from 2 to 5, S0 and S1 are integers as small as possible in such a way that S1 can also be equal to S0 and where B has a value of 0.3 (B=0.3) and a winding scheme in such a way that the 10 windings can be energized through a voltage source or current source so that the 10 windings form as many north-and south- poles necessary to achieve full stepangles=electrical angle 90=αF, αF=360/10 NR and half stepangle=electrical angle 45=αH, αH=360/20 NR, and an electrical shiftangle of 36 will be achieved between poles 1 and 8, between poles 2 and 9, between poles 3 and 10, and so on, counted in one direction.

4. A stepper motor according to claim 3, wherein the pole windings of two (2) opposite poles get energized in such a way that the poles have opposite polarity (north and south).

5. A stepper motor according to claim 3, wherein the constants K, S0, S1, are chosen in such a way that the stator has 10 teeth less than the number of rotor teeth NR; (NS=NR−10).

6. A multi-phase hybrid stepper motor comprising of a rotor system with at least one axially magnetized permanent magnet, having one polecap on each side; the polecap made of soft magnetic iron having on its peripherya number of NR evenly spaced, radially outward directed teeth; the rotorpolecaps on each side are offset in rotational direction to each other by one half (½) toothpitch Tp=360 NR, a nonsymmetrical stator surrounding the rotor and having ten (10) radially inwardly directed statorpoles, each of the poles having one untapped winding; the poles having two or more teeth spaced with said toothpitch Tp, a total number of stator teeth NS corresponding to the relation of NS=5(n0+n1) with n0 being the number of teeth of each of 5 poles and n1 the number of teeth of each of remaining 5 poles, each one of the poles in between of the 5 poles with n0 teeth placed in such a way that opposite of each of the poles n0 teeth is one pole with n1 teeth, a relationship between the number of rotor teeth NR and the total number of the stator teeth NS of NS≧0.8 NR (Equal or greater than) and with a difference between NR and NS which is defined by the equation NR−NS=K(S0−S1)+10(S1−1+B), where K is any integer varying from 2 to 5, and S0 and S1 are integer as small as possible in such a way that S1 can also be equal to S0 and where B has a value of 0.7, (B=0.7) and a winding scheme in such a way that the 10 windings can be energized through a voltage source or current source so that the 10 windings form as many north-and south-poles necessary to achieve full stepangle=electrocal angle 90=αF, αF=360/10 NR and half stepangle=electrical angle 45=αH, αH=360/20 NR, and an electrical shiftangle of 36 will be achieved between every fourth pole, as an example between poles 1 and 4, between poles 2 and 5, and so on, counted in one direction.

7. A stepper motor according to claim 6, wherein the pole windings of two (2) opposite poles get energized in such a way that the poles have oppoosite polarity (north and south).

8. A stepper motor according to claim 6, wherein the constants K, S0, S1 are chosen in such a way that the stator has 10 teeth less than the number of rotor teeth NR; (NS=NR−10).

9. A multi-phase hybrid stepper motor comprising of a rotor system with at least one exially magnetized permanent magnet, having one polecap on each side; the polecap made of soft magnetic iron having on its periphery a number of NR evenlyspaced, radially outward directed teeth; the rotor polecaps on each side are offset in rotational direction to each other by one half (½) toothpitch Tp=360/NR, a nonsymmetrical stator surrounding the rotor and having ten (10) radially inwardly directed statorpoles, each of the poles having one untapped winding; the poles having two or more teeth spaced with the toothpitch Tp, a total number of stator teeth NS corresponding to the relation of NS=5(n0+n1) with n0 being the number of teeth of each of 5 poles and n1 the number of teeth of each of remaining poles, each one of the poles in between of the 5 poles with n0 teeth placed in such a way that opposite of each of the poles n0 teeth is one pole with n1 teeth, a relationship between the number of rotor teeth NR and the total number of the stator teeth Ns≧0.8 NR (equal or greater than) and with a difference between NR and N5 which is defined by the equation NR−NS=K(S0−S1)+10(S1−1+B), where K is any integervarying from 2 to 5, S0 and S1 are integer as small as possible in such a way that S1 can also be equal to S0 and B has a value of 0.2, (B=0.2), and a winding scheme in such a way that the 10 windings can be energized through a voltage source or current source so that the 10 windings form as many north-and south-poles necessary to achieve full stepangle=electrical angle 90=αF, αF=360/10 NR and half stepangle 45=αH, αH=360/20 NR, and an electrical shiftangle of 72 will be achieved between every two adjacent poles.

10. A stepper motor according to claim 9, wherein the pole windings of two (2) opposite poles get energized in such a way that the poles have the same polarity (north and south).

11. A multi-phase hybrid stepper motor comprising of a rotor system with at least one exially magnetized permanent magnet, having one polecap on each side; the polecap made of soft magnetic iron having on its periphery a number of NR evenly spaced, radially outward directed teeth; the rotor polecaps on each side are offset in rotational direction to each other by one half (½) toothpitch Tp=360/NR, a nonsymmetrical stator surrounding the rotor and having ten (10) radially inwardly directed statorpoles, each of the poles having one untapped winding; the poles having two or more teeth spaced with said toothpitch Tp, a total number of stator teeth NS corresponding to the relation of NS=5(n0+n1) with n0 being the number of teeth of each of 5 poles and n1 the number of teeth of each of remaining 5 poles, each one of the poles in between of the 5 poles with n0 teeth placed in such a way that opposite of each of the poles n0 teeth is one pole with n1 teeth, a relationship between the number of rotor teeth NR and the total number of the stator teeth Ns of Ns≧0.8 NR (equal or greater than) and with a difference between NR and N5 which is defined by the equation NR−NS=K(S0−S1)+10(S1−1+B), where K is any integer varying from 2 to 5, S0 and S1 are integer as small as possible in such a way that S1 can also be equal to S0 and B has a value of 0.3, (B=0.3), and a winding scheme in such a way that the 10 windings can be energized through a voltage source or current source so that the 10 windings form as many north-and south-poles necessary to achieve full stepangle=electrical angle 90=αF, αF=360/10 NR and half stepangle=electrical angle 45=αH, αH=360/20 NR, and an electrical shiftangle of 36 will be achieved between poles 1 and 8, between poles 2 and 9, between poles 3 and 10, and so on, counted in one direction, and the constants K S0, are chosen in such a way that the stator has 3 teeth less than the number of rotor teeth NR; (NS=NR−3).

12. A stepper motor according to claim 11, wherein every second of the ten poles has one more tooth in such a way that 5 poles have a number of teeth n0, and their adjacent poles have a number of teeth n1.

13. A multi-phase hybrid steper motor comprising of a rotor system with at least one exially magnetized permanent magnet, having one polecap on each side; the polecap made of soft magnetic iron having on its periphery a number of NR evenly spaced, radially outward directed teeth; the rotor polecaps on each side are offset in rotational direction to each other by one half (½) toothpitch Tp=360/NR, a nonsymmetrical stator surrounding the rotor and having ten (10) radially inwardly directed statorpoles, each of the poles having one untapped winding; the poles having two or more teeth spaced with said toothpitch Tp, a total number of stator teeth NS coresponding to the relation of NS=5(n0+n1) with n0 being the number of teeth of each of 5 poles and n1 the number of teeth of each of remaining 5 poles, each one of the poles in between of the 5 poles with n0 teeth placed in such a way that opposite of each of the poles n0 teeth is one pole with n1 teeth, a relatinship between the number of rotor teeth NR and the total number of the stator teeth Ns of NS≧0.8 NR(equal or greater than) and with a difference between NR and N5 which is defined by the equation NR−NS=K(S0−S1)+10(S1−1+B), where K is any integer varying from 2 to 5, S0 and S1 are integer as small as possible in such a way that S1 can also be equal to S0 and B has a value of 0.3, (B=0.3), and a winding scheme in such a way that the 10 windings can be energized through a voltage source or current source so that the 10 windings form as many north-and south-poles necessary to achieve full stepangle=electrical angle 90=αF, αF=360/10 NR and half stepangle=electrical angle 45=αH, αH=360/20 NR, and an electrical shiftangle 36 will be achieved between poles 1 and 8, between poles 2 and 9, between poles 3 and 10, and so on, counted in one direction, and the constants K, S0, S1 are chosen in such a way that the stator has 5 teeth less than the number of rotor teeth NR; (NS=NR−5).

14. A stepper motor according to claim 13, wherein every second of the ten poles has one more tooth in such a way that 5 poles have a number of teeth of teeth n0, and their adjacent poles have a number of teeth n1.

15. A multi-phase hyrid stepper motor comprising of rotor system with at least one exially magnetized permanent magnet, having one polecap on each side; the polecap made of soft magnetic iron having on its periphery a number of NR evenly spaced, radially outward directed teeth; the rotor polecaps on each side are offset in rotational direction to each other by one half (½) toothpitch Tp=360/NR, a nonsymmmetrical stator surrounding the rotor and having ten (10) radially inwardly directed statorpoles, each of the poles having one untapped winding; the poles having two or more teeth spaced with said toothpitch Tp, a total number of stator teeth NS coresponding to the relation of NS=5(n0+n1) with n0 being the numer of teeth of each of 5 poles and n1 the number of teeth of each of remaining 5 poles, each one of the poles in between of the 5 poles with n0 teeth placed in such a way that opposite of each of the poles n0 teeth is one pole with n1 teeth, a relationship between the number of rotor teeth Nr and the total number of the stator teeth Ns≧0.8 NR(equal or greater than) and with a difference between NR and N5 which is defined by the equation NR−NS=K(S0−S1)+10(S1−1 +B), where K is any integer varying from 2 to 5, S0 and S1 are integer as small as possible in such a way that S1 can also be equal to S0 and B has a value of 0.3, (B=0.3), and a winding scheme in such a way that the 10 windings can be enrgized through a voltage source or current source so that the 10 windings form as many north-and south-poles necessary to achieve full stepangle=electrical angle 90=αF, αF=360/10 NR and half stepangle=electrical angle 45=αH, αH=360/20 NR, and an electrical shiftangle of 36 will be achieved between poles 1 and 8, between poles 2 and 9, between poles 3 and 10, and so on, counted in one direction, and the constants K, S0, S1 are chosen in such a way that the stator has 15 teeth less than the number of rotor teeth NR; (NS=NR−15).

16. A stepper motor according to claim 15, wherein every second of the ten poles has one more tooth in such a way that 5 poles have a number of teeth N1.

17. A multi-phase hybrid stepper motor comprising of a rotor system with at least one axially magnetized permanent magnet, having one polecap on each side; the polecap made of soft magnetic iron having on its periphery a number of NR evenly spaced, radially outward directed teeth; the rotor polecaps on each side are offset in rotational direction to each other by one half (½) toothpitch Tp=360/NR, a nonsymmetrical stator surrounding the rotor and having ten (10) radially inwardly directed statorpoles, each of the poles having one untapped winding; the poles having two or more teeth spaced with the toothpitch Tp, a total number of stator teeth NS corresponding to the relation of NS=5(n0+n1) with n0 being the number of teeth of each of 5 poles and n1 the number of teeth of each of remaining 5 poles, each one of the poles in between of the 5 poles with n0 teeth placed in such a way that opposite of each of the poles n0 teeth is one pole with n1 teeth, a relationship between the number of rotor teeth NR and the total number of the stator teeth Ns of Ns≧0.8 NR (equal or greater than) and with a difference between NR and N5 which is defined by the equation NR−NS=K(S0−S1)+10(S1−1+B), where K is any integer varying from 2 to 5, S0 and S1 are integer as small as possible in such a way that S1 can also be equal to S0 and B has a value of 0.7, (B =0.7), and a winding scheme in such a way that the 10 windings can be energized through a voltage source or current source so that the 10 windings form as many north-and south-poles necessary to achieve full stepangle=electrical angle 90=αF, αF=360/10 NR and half stepangle=electrical angle 45=αH, αH=360/20 NR, and an electrical shiftangle of 36 will be achieved between every fourth pole, as an example between poles 1 and 4, between poles 2 and 5, and so on, counted in one direction, and the constants K, S0, S1 are chosen in such a way that the stator has 7 teeth less than the number of rotor teeth NR; (NS=NR−7).

18. A stepper motor according to claim 17, wherein every second of the ten poles has one more tooth in such a way that 5 poles have a number of teeth n0, and their adjacent poles have a number of teeth n1.

19. A multiphase hybrid stepper motor comprising of a rotor system with at least one axially magnetized permanent magnet, having one polecap on each side; the polecap made of soft magnetic iron having on its periphery a number of NR evenly spaced, radially outward directed teeth; the rotor polecaps on each side are offset in rotational direction to each other by one half (½) toothpitch Tp=360/NR, a nonsymmetrical stator surrounding the rotor and having ten (10) radially inwardly directed statorpoles, each of the poles having one untapped winding; the poles having two or more teeth spaced with said toothpitch Tp, a total number of stator teeth NS corresponding to the relation of NS=5(n0+N1) with n0 being the number of teeth of each of 5 poles and n1 the number of teeth of each of remaining 5 poles, each one of the poles in between of the 5 poles with n0 teeth placed in such a way that opposite of each of the poles n0 teeth is one pole with n1 teeth, a relationship between the number of rotor teeth NR and the total number of the stator teeth Ns of Ns≧0.8 NR (equal or greater than) and with a difference between NR and NS which is defined by the euation. NR−NS=K(S0−S1)+10(S1−1+B), where K is any integer varying from 2 to 5, S0 and S1 are integer as small as possible in such a way that S1 can also be equal to S0 and B has a value of 0.2, (B=0.2), and a windings scheme in such a way that the 10 windings can be energized through a voltage source or current source so that the 10 windings form as many north-and south-poles necessary to achieve full stepangle=electrical angle 90=αF, αF=360/10 NR and half stepangle=electrical angle 45=αH, αH=360/20 NR, and an electrical shiftangle of 72 will be achieved between every two adjacent poles, and the constants K, S0, S1 are chosen in such a way that the stator has 5 teeth less than the number of rotor teeth NR; (NS=NR−5).

20. A stepper motor according to claim 19, wherein every second of the ten poles has one more tooth in such a way that 5 poles have a number of teeth n0, and their adjacent poles have a number of teeth n1.

* * * * *

UNITED STATES PATENT AND TRADEMARK OFFICE
CERTIFICATE OF CORRECTION

PATENT NO. : 5,374,865                    Page 1 of 5
DATED      : December 20, 1994
INVENTOR(S): Noriyuki YOSHIMURA et al It is certified that error appears in the above-indentified patent and that said Letters Patent is hereby corrected as shown below:

Col. 1, line 14, delete "a"

Col. 1, line 38, delete "center" and insert --(center--

\* Col. 2, line 8, delete "deagram" and insert --diagram--

Col. 2, line 25, delete "H" and insert --II--

\* Col. 2, line 45, delete "horque" and insert --torque--

\* Col. 3, line 38, delete "relativery" and insert --relatively--

\* Col. 3, line 56, delete "derection" and insert --direction--

\* Col. 3, line 57, delete "polariry" and insert --polarity--

Col 4, line 8, after "5" insert --%--

Col. 4, line 4, delete "10pole" and insert --10-pole--

\* Col. 4, line 49, delete "holdingtorque" and insert --holding torque--

\* Col. 5, line 3, delete "two" (second occurrence)

UNITED STATES PATENT AND TRADEMARK OFFICE
CERTIFICATE OF CORRECTION

PATENT NO. : 5,374,865
DATED : December 20, 1994
INVENTOR(S) : N. Yoshimura et al It is certified that error appears in the above-indentified patent and that said Letters Patent is hereby corrected as shown below:

\*     Col. 5, line 19, delete "oneach" and insert --on each--

\*     Col. 5, line 46, delete "gizedthrough" and insert --gized through--

\*     Col. 6, line 7, delete "sectinal" and insert --sectional--

\*     Col. 6, line 24, delete "statorpolesof" and insert --stator poles of--

\*     Col. 6, line 52, delete "stabilitysince" and insert --stability since--

\*     Col. 6, line 62, delete "nonsymmetrica" and insert --nonsymmetrical--

\*     Col. 7, line 16, "delete "concecutive" and insert --consecutive--; delete "evidient" and insert --evident--

UNITED STATES PATENT AND TRADEMARK OFFICE
CERTIFICATE OF CORRECTION

PATENT NO. : 5,374,865
DATED : December 20, 1994
INVENTOR(S) : N. Yoshimura et al It is certified that error appears in the above-indentified patent and that said Letters Patent is hereby corrected as shown below:

\*     Col. 7, line 18, delete "redues" and insert --reduces--

\*     Col. 7, line 29, delete "reenergizedand" and insert --reenergized and--

Col. 7, line 39, delete "$n_1 32$" and insert --$n_1$--

\*     Col. 7, line 43, delete "afraction" and insert --a fraction--

\*     Col. 8, line 27, delete "torm" and insert --form--

\*     Col. 9, line 14, delete "rotorpolecaps" and insert --rotors polecaps--

\*     Col 9, line 54, delete "exially" and insert --axially--

\*     Col. 9, line 57, delete "evenlyspaced" and insert --evenly spaced--

Col. 9, line 68, after "remaining" insert --5--

UNITED STATES PATENT AND TRADEMARK OFFICE
CERTIFICATE OF CORRECTION

PATENT NO. : 5,374,865
DATED : December 20, 1994
INVENTOR(S) : N. Yoshimura et al It is certified that error appears in the above-indentified patent and that said Letters Patent is hereby corrected as shown below:

\* Col 10, line 8, "delete "integervarying" and insert --integer varying--

\* Col. 10, line 23, delete "exially" and insert --axially--

Col 10, line 62, after "n1" insert --[nO = n1+1; NS = 5(nO+n1)]--

\* Col. 11, line 13, delete "relatinship" and insert --relationship--

Col. 11, line 35, after "n1" insert --[nO = n1+1; NS = 5(nO+n1)]--

\* Col. 11, line 43, delete "nonsymmmetrical" and insert --nonsymmetrical--

UNITED STATES PATENT AND TRADEMARK OFFICE
CERTIFICATE OF CORRECTION

PATENT NO. : 5,374,865
DATED : December 20, 1994
INVENTOR(S) : N. Yoshimura et al It is certified that error appears in the above-indentified patent and that said Letters Patent is hereby corrected as shown below:

Col. 12, line 7, after "n1" insert --[n0 = n1+1; NS = 5(n0+n1)]

\*   Col. 13, lines 3 and 4, delete "euation" and insert --equation--

Col. 14, line 10, after "n1" insert --[n0 = n1+1; NS = 5(n0+n1)--.

Signed and Sealed this

Eighteenth Day of April, 1995

Attest:

BRUCE LEHMAN

*Commissioner of Patents and Trademarks*

*Attesting Officer*